United States Patent [19]

Fabrice

[11] Patent Number: 4,921,233

[45] Date of Patent: May 1, 1990

[54] CLAMPING DEVICE FOR PLATES OR PROFILED ELEMENTS PLACED ONE AGAINST THE OTHER

[75] Inventor: Goussu Fabrice, Le Chesnay, France

[73] Assignee: Genus International, France; a part interest

[21] Appl. No.: 350,363

[22] Filed: May 5, 1989

[30] Foreign Application Priority Data

May 6, 1988 [FR] France ................................ 88 06176

[51] Int. Cl.[5] ................................................ B23Q 3/03

[52] U.S. Cl. ...................................................... 269/32

[58] Field of Search ...................... 269/24, 27, 32, 239, 269/228, 91, 93, 94

[56] References Cited

U.S. PATENT DOCUMENTS 3,702,185 11/1972 Blatt ...................................... 269/32
4,240,620 12/1980 Tunkers ................................ 269/32
4,591,138 5/1986 Balls et al. ............................ 269/32
4,637,597 1/1987 McPherson et al. ................. 269/32

*Primary Examiner*—Robert C. Watson
*Attorney, Agent, or Firm*—Larson and Taylor

[57] ABSTRACT

This invention relates to a clamping device for plates (3, 4) comprising at least one clamping head (5) including a body (11), a clamping member (12) adapted for rotating around a fixed axle (22) and rotation means (23) for rotating said clamping member (12) around said fixed axle (22) comprising at least a link (24) pivotably fixed to said clamping member (12), a carriage (28) provided with a roller (30) moveable substantially linearly along at least one guiding ramp (31) having a curved contact surface for engagement with the concave roller the curvature axis of which are located on one side of the fixed axle (22) with respect to the plane (45) defined by the central axis (26') of the link (24) and the central axis (29') of the roller (30). The distance (d) between the central axis (26') and the central axis (29') is greater than the distance (d') between the central axis (22') of the fixed axle (22) and a plane (51) parallel to the fixed axle (22) extending through the central axis (29') when the carriage is in said clamping position.

11 Claims, 7 Drawing Sheets

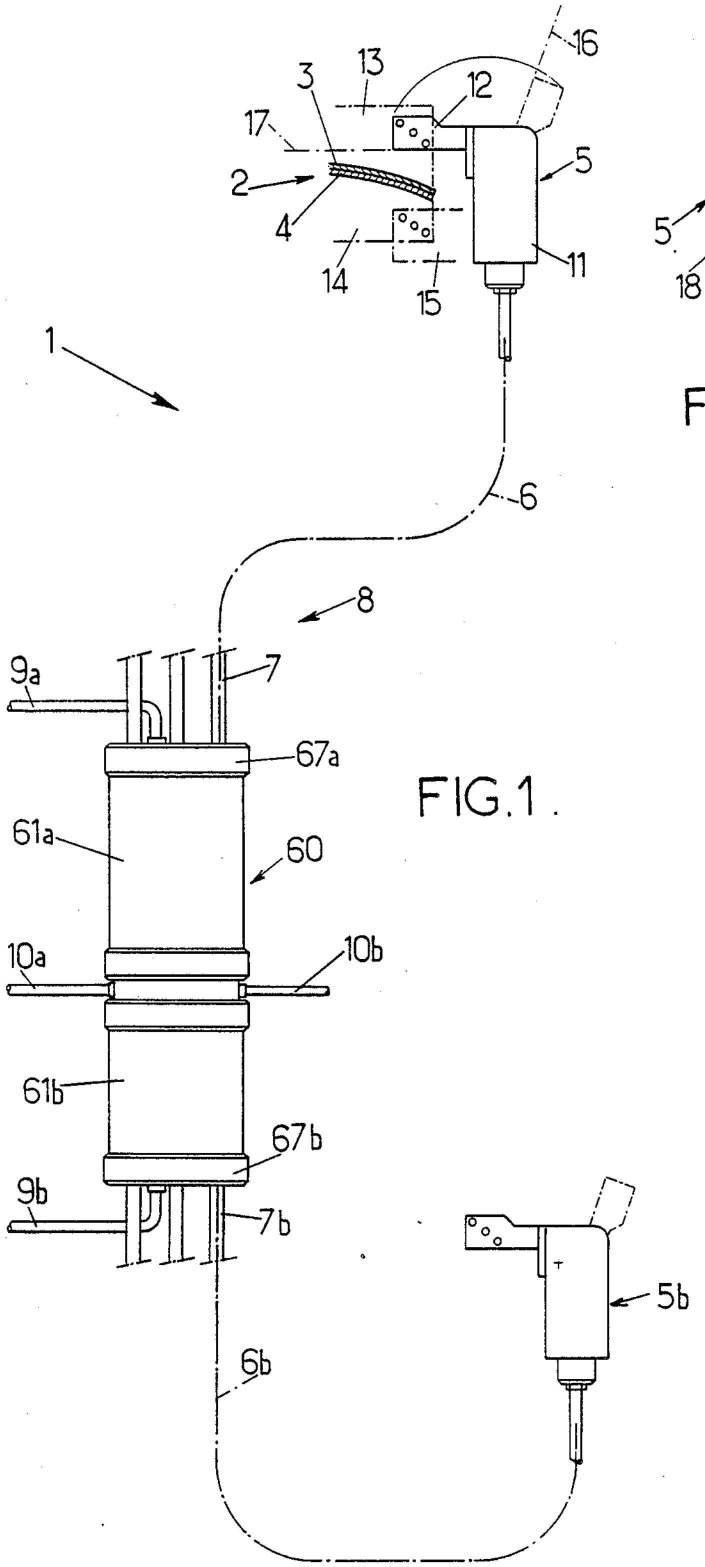
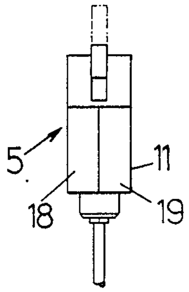
FIG.1a
FIG.1.

FIG.4.
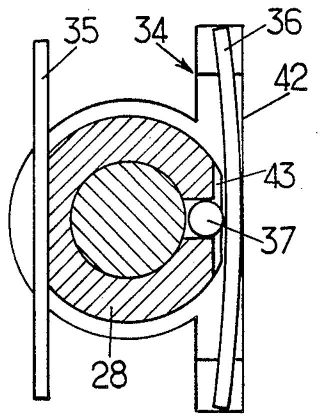
FIG.2.
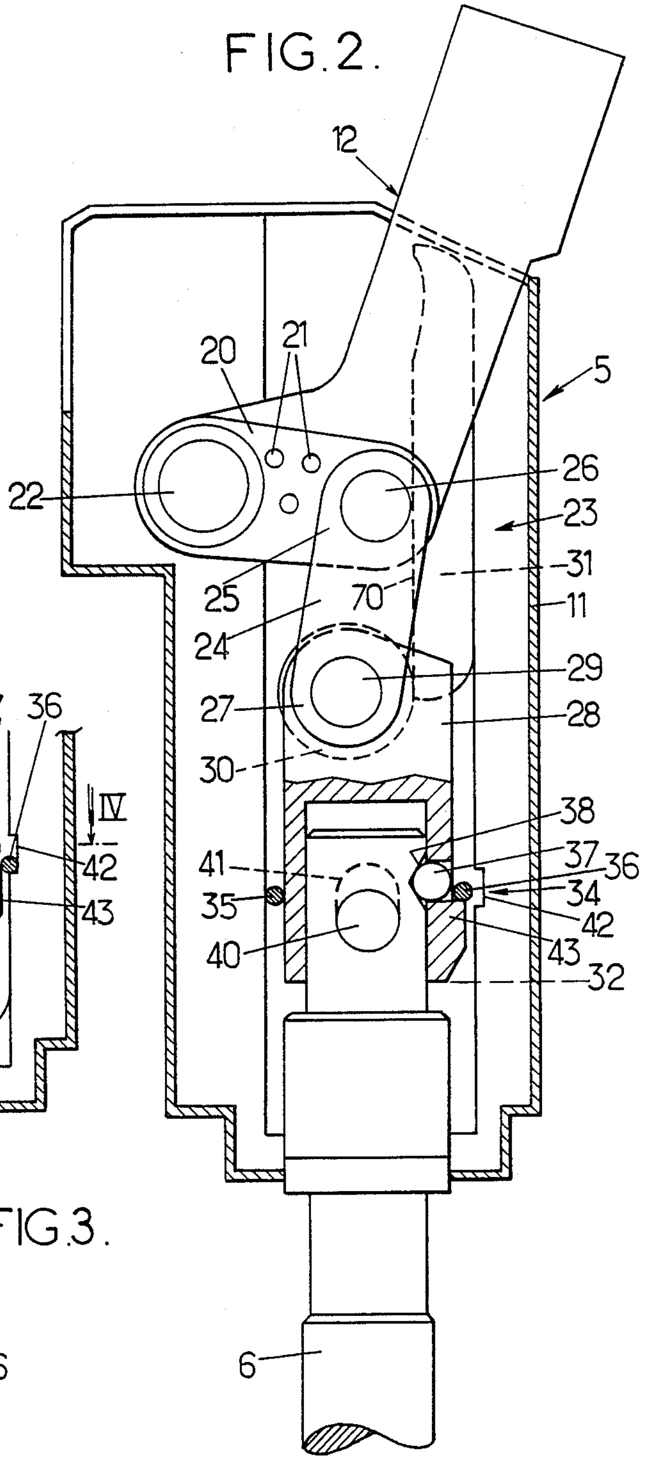
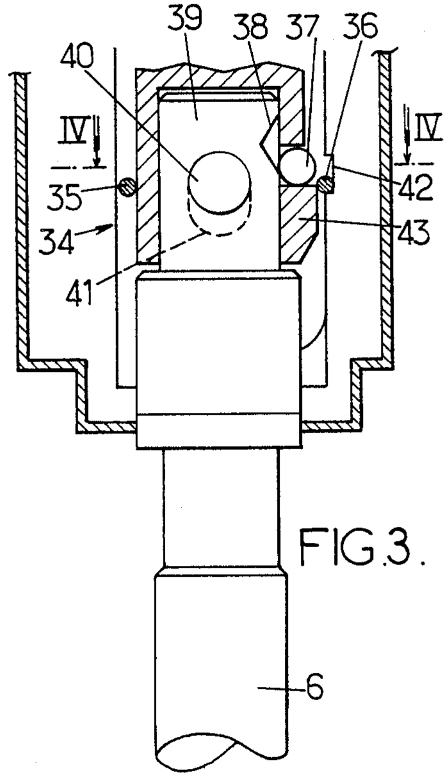
FIG.3.

CLAMPING DEVICE FOR PLATES OR PROFILED ELEMENTS PLACED ONE AGAINST THE OTHER

The present invention relates to clamping devices for at least one set of two plates or profiled elements placed one against the other of a type comprising at least one clamping head, said clamping head comprising a body, a clamping element suitable for pivoting around a fixed axle integral with the body and provided with a gripping end intended for gripping said plates together against a buttressing part and means for rotating said clamping element round the fixed axle, comprising at least a link one of whose ends is attached pivotingly to said clamping element, parallel to the fixed axle, and the other end is fixed pivotingly to a carriage round the axle of at least one roller of said carriage, which is moveable substantially linearly along at least one guiding ramp of a certain shape between a so-called retractable position of the clamping element and a so-called gripping position, said ramp being attached to the body on one side of the fixed axle opposite the side occupied by the gripping end when the carriage is in said gripping position.

The invention has particularly important, but not exclusive, applications in the field of multiple-head clamping devices under remote control by pneumatic, hydraulic or electrical means, ensuring the positioning or shaping of metal sheets, of profiled elements made of metal or any other material that must be assembled and/or processed and that are positioned in a certain way on a reference buttressing part.

Clamping devices of the above type are already known (FR-A-2 587 638). Such clamping devices operate satisfactorily but they can be improved. In fact, and notably, the definitive clamping of plates or profiled elements placed one against the other is achieved in each instance after deformation of an elastic pad that is attached permanently to the ramps and whose elastic characteristics degrade with time. The force applied during gripping can thus decline appreciably in the course of the "life" of the clamping head.

The object of the present invention is to provide a clamping device of the above type that will meet practical requirements better than those previously known, notably in that it permits the locking of plates or profiled elements one against the other without any risk of blocking since, structurally, no jamming of any sort between clamping element, link and travel carriage is possible; in a preferred embodiment it makes it possible to maintain substantially constant during the entire "life" of the clamping heads (1,600,000 cycles) the force applied by the clamping element through its gripping end on plates clamped one against the other; it also makes it possible to modulate the force exerted during clamping, in accordance with specific requirements placed on the clamping heads. Finally, in an advantageous embodiment, it permits control of several clamping heads by means of one small, compact monobloc unit, two different gripping sequences being possible for each clamping head.

For this purpose, the invention proposes notably a clamping device for at least one set of two plates or profiled elements, placed one against the other, of the type defined above, characterized in that the guiding ramp features a curved, concave surface of contact with the roller when the carriage comes into the gripping position, whose centers of curvature in each of the points of said surface are located on the side of the fixed axle in relation to the plane defined by the central axis of the axle of the link, integral with the clamping element and the central axis of the roller of the carriage when the latter is in said gripping position, and the distance between the central axis of the axle of the link and the central axis of the roller is greater than the distance between the central axis of the fixed axle and a plane parallel to the fixed axle passing through the central axis of the roller when the carriage is in said gripping position.

In advantageous embodiments, one and/or the other of the following arrangements are used:

the radii of the curvature of the curved, concave surface of contact with the roller, and the distance between the central axis of the axle of the link, integral with the clamping element, and the central axis of the roller are desiged so as to to maintain, for a certain travel of the carriage up to its gripping position, an angle that is substantially constant between, on the one hand, the plane defined by the central axis of the axle of the link, integral with the clamping element, and the central axis of the roller and, on the other hand, the plane defined by said central axis of the axle of the link, integral with the clamping element, and the central axis of the fixed axle;

the guiding ramp comprises, at the level and in proximity of the curved surface of contact with the roller, a central recessed portion, provided with a spring arranged so as to exert a certain force on the link through the roller crosswise to the direction of linear travel of the carriage when said carriage is in gripping position;

the guiding ramp also includes means for adjusting said certain force exerted by the spring on the link;

means of linear travel of the carriage comprise a cable, fixed to said carriage and arranged so as to transmit both the traction forces and the thrust forces and means of pneumatic actuation, advantageously comprising a pneumatic sequencer.

The invention will be more clearly understood by means of the following description of a particular embodiment, given as a non-limiting example.

The description refers to the attached drawings in which:

FIG. 1 is a schematic and partial view of a clamping device comprising several clamping heads in accordance with invention;

FIG. **1*a* is a frontal view of the clamping head of FIG. 1**;

FIG. 2 is a cross-sectional, partial, schematic view of the clamping head of FIG. 1, the clamping head being in locked retracted position;

FIG. 3 is a partial view of the lower part of the head, after this retracted position has been unlocked;

FIG. 4 is a cross-section along IV–IV of FIG. 3;

Figure 5:
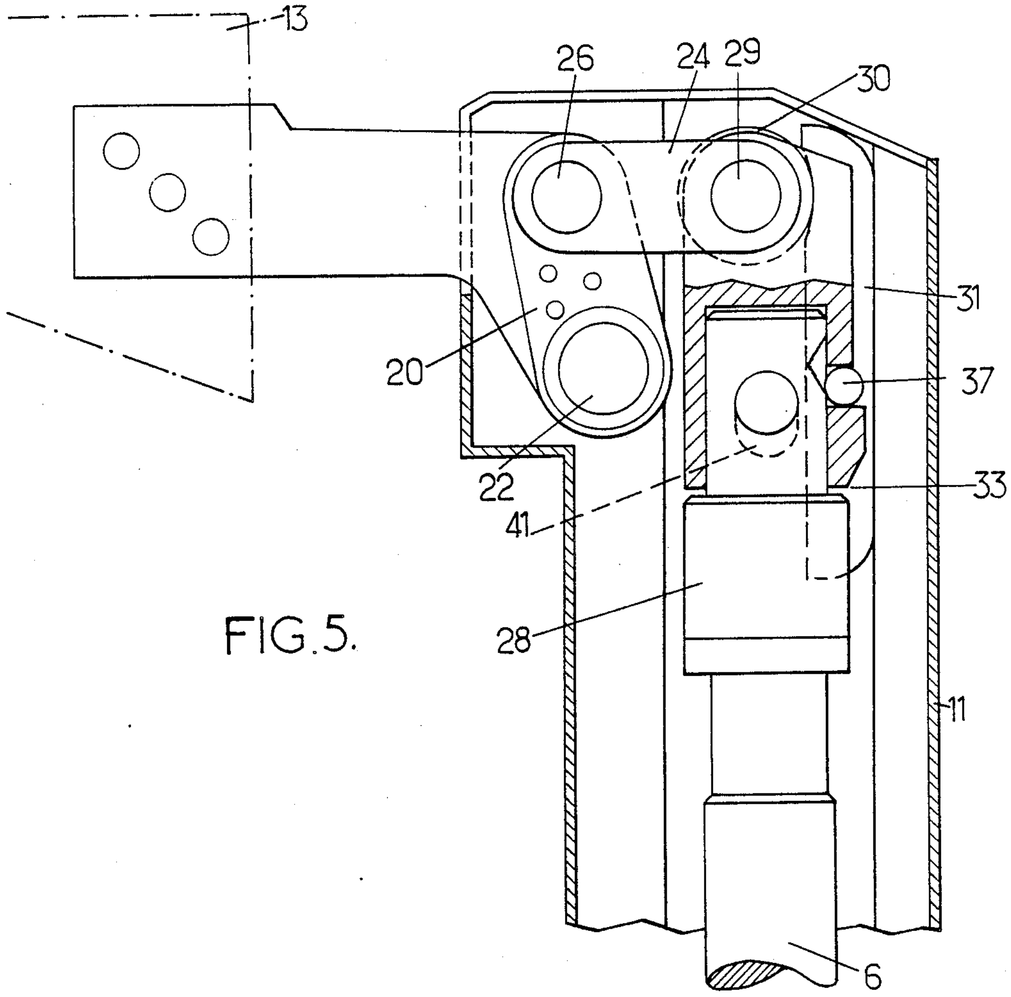
FIG. 5 is a schematic view, in partial cross-section, of part of the clamping head of FIG. 1, in gripping position.

FIG. 1 shows clamping device 1 of at least one set 2 of two metal plates or profiled elements 3 and 4, comprising several clamping heads, 5, 5*b*, actuated by push-pull cables 6, 6*b* that allow transmission of both traction forces and thrust forces. Cables 6, 6*b* are guided by sheaths 7, 7*b* and are actuated by pneumatic means of linear travel 8, supplied with compressed air at 9*a*, 9*b* and 10*a*, 10*b*. Each of the clamping heads is similar to clamping head 5 which will now be described. Clamping head 5 comprises body 11 and clamping head 12 with gripping end 13 designed to grip plates 3, 4 together on buttressing part 14 which, in turn, is rigidly attached to support 15 integral with clamping head 5. Clamping element 12 is arranged so as to reach extreme positions, position 16 for releasing plates 3 and 4, and position 17 for gripping plates 3 and 4 against buttressing part 14.

FIG. 1*a* is a frontal view of clamping head 5, showing body 11 constituted by two halves 18 and 19 that are separable and attached to each other by known means. This arrangement permits access to the inside of the clamping head.

FIG. 2 shows the inside of clamping head 5 of FIG. 1. Clamping element 12 comprises for example connecting rod 20 rigidly attached at 21 to the rest of said guiding element. Connecting rod 20 is suitable for pivoting round fixed axle 22, integral with body 11. Means 23 are provided for rotation of clamping element 12 round fixed axle 22. These means 23 comprise at least link 24, one end 25 of which is attached pivotingly to connecting rod 20 round axle 26 integral with said connecting rod 20, axle 26 being parallel to fixed axle 22, and the other end 27 of said link 24 is attached pivotingly to carriage 28 round axle 29 of roller 30 of said carriage 28. Said carriage 28 is substantially linearly mobile via roller 30 along guiding ramp 31 between so-called retractable position 32 of the clamping element (see FIG. 2), corresponding to position 16 of the clamping element for releasing parts 3 and 4, and so-called gripping position 33 of the clamping element (see FIG. 5), corresponding to position 17 of the clamping element, for gripping parts 3 and 4 against buttressing part 14. Ramp 31 is attached to body 11 of the clamping head on one side of fixed axle 22 opposite the side occupied by gripping end 13 when carriage 28 is in gripping position 33 (see FIG. 5).

FIGS. 2, 3 and 4 show means 34 for locking carriage 28 in position 32, in the retracted position of the clamping element. Locking means 34 comprise two rod springs 35 and 36 that are substantially parallel and located on each side of fixed axle 22. Rod springs 35 and 36 are attached to body 11 and are suitable for applying pressure to ball 37, integral with carriage 28 by means that are well known, in notch 38 of end part 39 of push-pull cable 6 of the linear travel means. End part 39 is attached to the carriage by axle 40 cooperating with two oblong holes 41 created laterally with functional play in carriage 28. This play is such that, when cable 6 is pulled to bring the carriage into retracting position 32 for the clamping element, notch 28 is made to face the ball which is then pushed by rod spring 36 into said notch 38, thereby locking the position of the carriage. By contrast, if cable 6 is pushed, axle 40 is also pushed in oblong holes 41, which moves notch 38 away from ball 37 which then pushes rod spring 36 into notch 42 of body 11 and thus releases protruding part 43 of the carriage which can then move beyond the rod spring.

FIG. 5 shows the clamping head in gripping position, carriage 28 having been pushed all the way to gripping position 33 of the clamping head.

Figure 6:
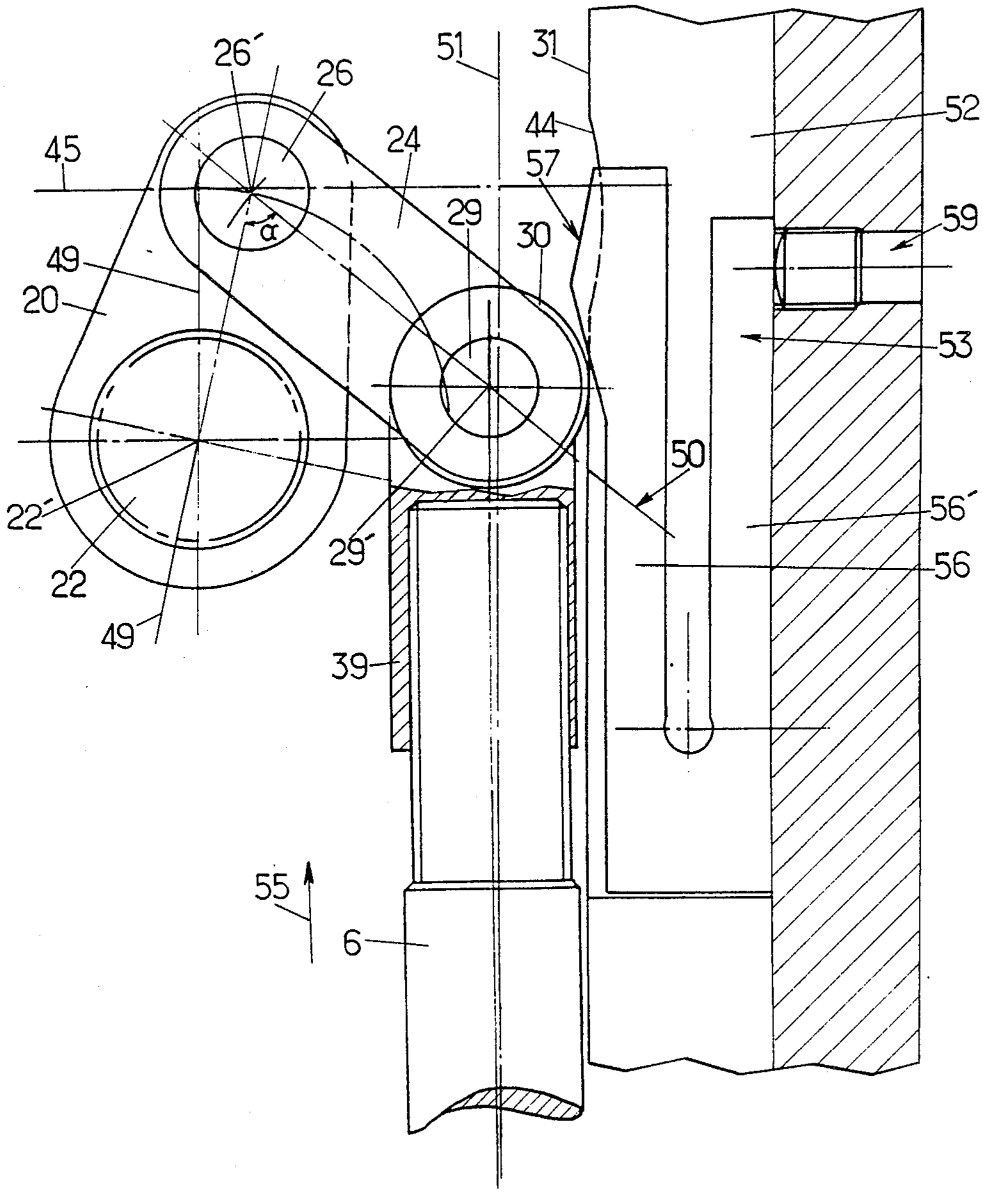
FIGS. 6, 7 and 8 are schematic views respectively before, during and after the arrival in gripping position of the clamping element, the different positions taken respectively by the carriage and by the spring arranged so as to exert a certain force on the link actuating said clamping element, in relation to the curved, concave surface of contact with the roller of said carriage.
Figure 7:
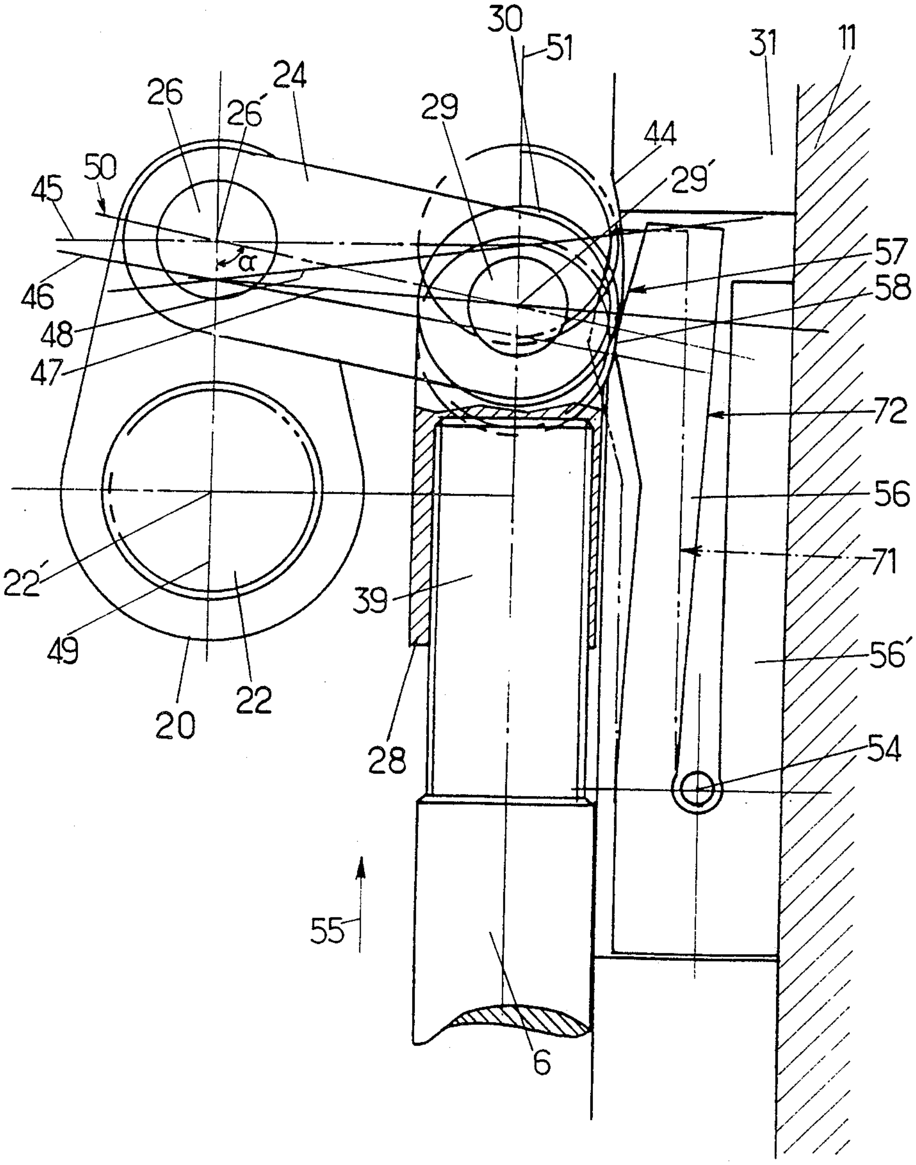
Figure 8:
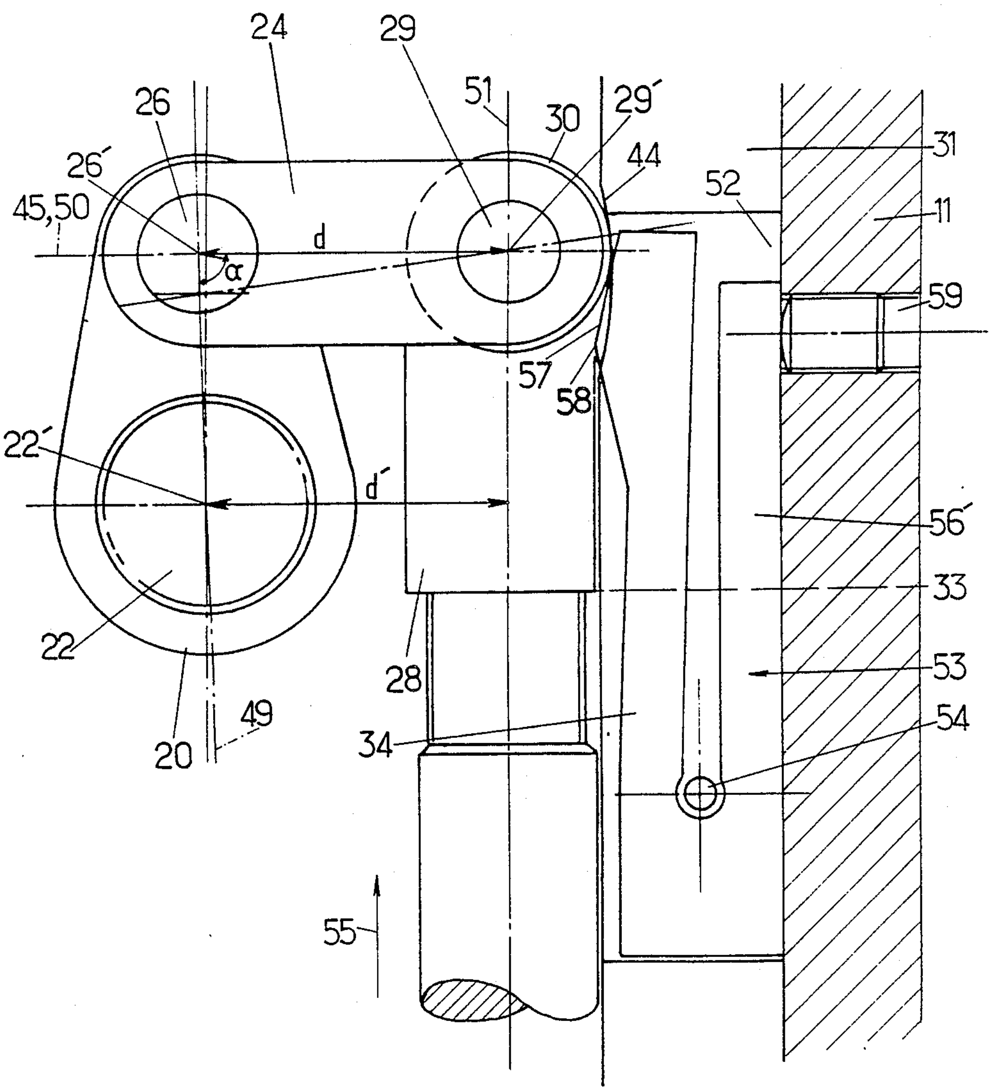

We will now describe, by referring to FIGS. 6, 7 and 8, an essential arrangement of the device of the invention which concerns the characteristics of certain elements of the device when the carriage moves into gripping position 33 of the clamping head. According to the invention, guiding ramp 31 features curved concave surface 44 of contact with roller 30 when the latter arrives in gripping position 33 of the clamping head, such that the centers of curvature at each point of said surface are located on the side of fixed axle 22, in relation to plane 45 formed by central axis 26′ of the axle of link 24, integral with connecting rod 20 of clamping element 12, and central axis 29′ of axle 29 of roller 30 of carriage 28 when said carriage is in gripping position 33 of the clamping element (see FIG. 8). In other words, the radii of curvature of surface 44, such as 46, 47, 48 (see FIG. 7) are such that the centers of curvature are located below plane 45 in the direction of fixed axle 22 in relation to this plane.

Moreover, distance d between central axis 26 of axle 26 of link 24 and central axis 29′ of axle 29 of roller 30 is designed to be greater than distance d′ between central axis 22′ of fixed axle 22 and plane 51 parallel to fixed axle 22 passing through central axis 29′ of roller axle 29 when carriage 28 is in gripping position 33 (see FIG. 8).

Angle alpha between plane 50 passing through central axis 26′ of axle 26 of link 24, integral with the clamping element, and central axis 29′ of the roller, and plane 49 defined by said axis 26′ of the link and central axis 22′ of fixed axle 22, is thus always kept at a value smaller than 90°, which makes it possible to escape any risk of jamming and thus of blocking. In a preferred embodiment of the invention, the device is such that, during the movement of the roller over the curbed surface corresponding to a travel of the carriage, for example of a few millimeters, the position of connecting rod 20 remains substantially unchanged, despite the movement of link 24, which results in a substantially constant clamping force. To achieve this, radii of curvature 46, 47, 48, etc., of curved surface 44 and distance d between central axis 26′ of axle 26, integral with element 12 of link 24, and central axis 29′ of roller 29, are structurally arranged to maintain during a given travel of the carriage up to gripping position 33 a substantially constant angle alpha between plane 50 passing through central axis 26′ of axle 26 of the link integral with the clamping element and central axis 29′ of axle 29 of roller 30, and plane 49 passing through said central axis 26′ of the link, and central axis 22′ of fixed axle 22. To achieve this, the radii of curvature of each point of surface 44 are, for example, located in the same plane, advantageously plane 49. Surface 44 can also be substantially cylindrical, in which case the centers of curvature are substantially on a straight line, parallel to fixed axle 22. The clamping force on the plates being directly proportionally to angle alpha, a clamping force is thus achieved that is substantially constant for a travel of the carriage over a certain length. Advantageously, angle alpha is in the order of 80° to 89° and preferably between 85° and 88°, and the ratio between distances d and d′ defined above is between 1.02 and 1.1.

Guiding ramp 31 comprises, on an end part one portion of which is at the level of curved surface 44 of contact with the roller, central recessed part 52, or housing, provided with spring 53 constituted by a steel pin. Pin 53 rests in said housing 52 with freedom of movement in relation to axle 54 integral with body 11 and is arranged to exert a certain force on link 24 via roller 30 crosswise to the carriage's substantially linear direction of travel 55 when said carriage is in gripping position. The pin is removable and features flexible leg 56 provided with portion 57 of convex surface suitable for comping into contact with roller 30. Flexible leg 56 is pressed upon by roller 30 and apex 58 of said convex surface is passed by roller 30 when carriage 28 is in gripping position 33 so that locking of the roller by the pin is achieved (see FIG. 8).

Adjusting means, constituted for example by screw 59, arranged so as to act on the pin's other leg 56', make it possible to increase or reduce the certain force exerted by spring 53 on link 24 via roller 30.

Figure 9:
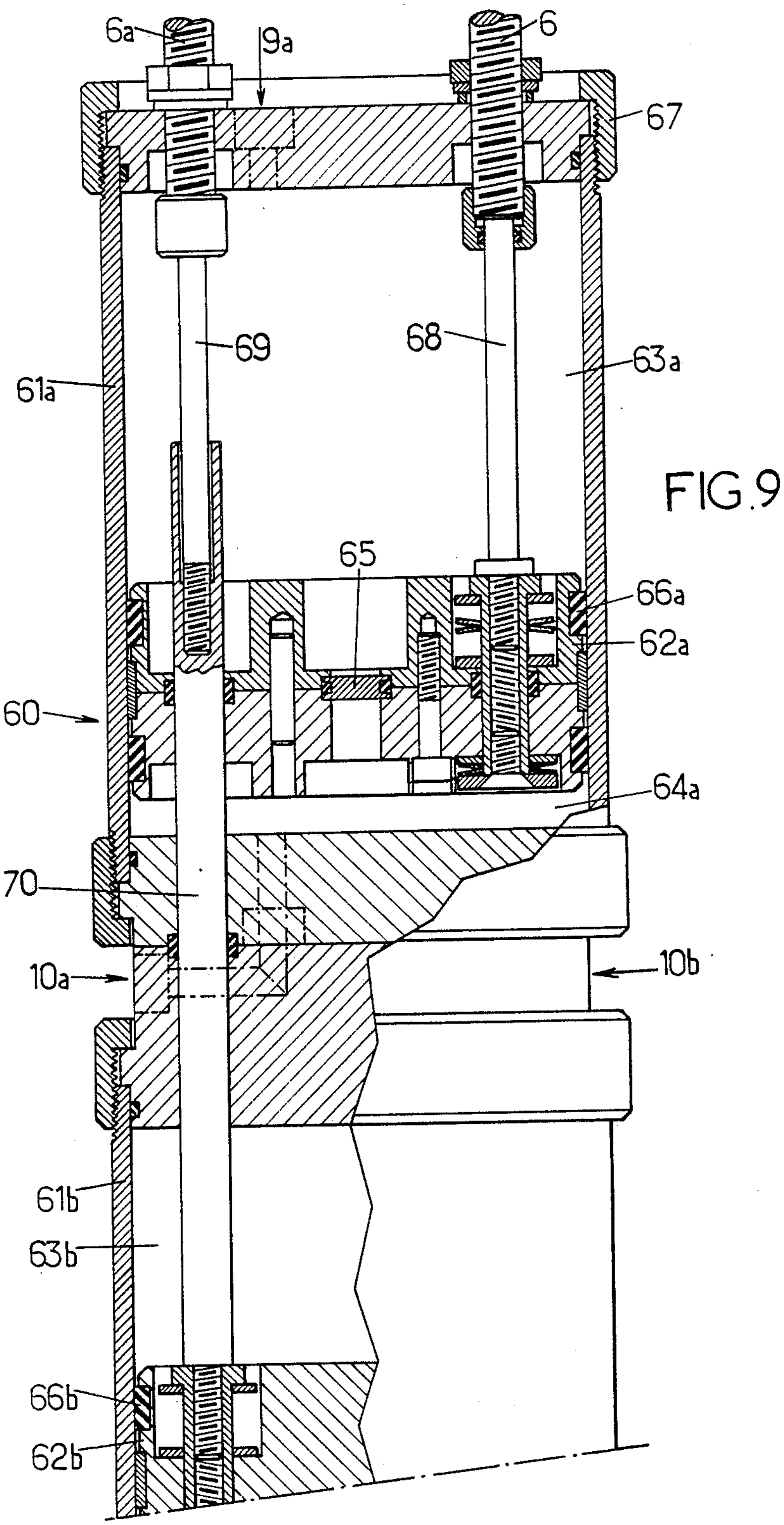
FIG. 9 is a view, partially in cross-section, of part of the pneumatic actuating means of the device of FIG. 1.

Device 1 is actuated by pneumatic means of linear travel 8 comprising sequencer 60. Said sequencer comprises two identical housings **61*a* and 61*b* (see FIG. 9) supplied with compressed air, either at 9*a*, 9*b* or at 10*a*, 10*b*. Each housing 61*a*, 61*b* is provided respectively with mobile drawer 62*a*, 62*b*, delimiting respectively two chambers 63*a*, 64*a* and 63*b*, 64*b*, suitable to being filled with compressed air and to push drawers 62*a*, 62*b* in one direction or the other. Each drawer comprises shutter 65 between the two chambers 63*a*, 64*a* and 63*b*, 64*b*, so as to bypass said drawer or not during operation of a housing. Each drawer 62*a*, 62*b* slides in an airtight manner respectively inside housings 61*a*, 61*b*, air seals 66*a*, 66*b*, of a known type, being provided. Cables 6, 6*a*, 6*b*, etc, designed to actuate the clamping heads of the device are fastened respectively to cross-elements of two free ends of housings 67*a* and 67*b*, either to drawer 62*a* of housing 61*a* or to drawer 62*b* of housing 61*b*. This fastening is then effected either by means of control rod 68 directly attached to the drawer of the housing into which the cable enters, for example cable 6 to drawer 62*a*, or by means of control rod 69 and extension 70, crossing the drawer of the housing into which the cable enters, and attached to the drawer of the opposite, for example cable 6*a* to drawer 62*b*. In this manner, cable 6 operates differently than cable 6*a*. For example, the effect of compressed air supplied at 10*a* and at 10*b* will be to push drawer 62*a* by pulling cable 6 and, conversely, to pull cable 6 and to push cable 6*a* when compressed air is supplied at points 9*a* and 9*b***.

The operation of the clamping device is described below.

Each of the clamping heads is connected to pneumatic linear travel means 8 in such a manner that cables **6, 6*a*, 6*b*, etc. are actuated in the desired sequence. Compressed air is then fed to means 8 through inlets 9*a* and 9*b* or inlets 10*a* and 10*b* so as to push or pull the cables in the desired sequence, thereby achieving the clamping or release of plates or profiled elements 3 and 4, corresponding to each clamping head. This feed is effected automatically by means, for example, of a remote-control all-or-nothing valve (not shown) directing compressed air to 9*a* and 9*b* or to 10*a* and 10*b***. In this manner, multiple clamping heads (18 heads, for example) can be controlled simultaneously with two types of operating sequences, and this is done by simple and reliable means with little risk of breakdown.

We will now describe in more detail the operation of a a clamping head itself.

The initial state is represented by FIG. 2. The clamping element is raised and the carriage is in release position 32. The pieces of sheet metal or plates or profiled metal elements to be clamped one against the other are placed on buttressing part 14. Carriage 28 is in locked position, part 43, protruding or a stop, being blocked against rod spring 36, ball 37 being in notch 38.

The device then begins to move (see FIGS. 2, 3 and 4). End 39 of cable 6 shifts inside carriage 28, axle 40 starting to compensate the play in oblong hole 41 inside carriage 28. In the process, ball 37 is pushed out of notch 39 and pushes aside rod spring 36 to bring it in a carriage-release position, as shown in FIGS. 3 and 4. Once stop 43 is freed from rod spring 36, the carriage can move linearly. Roller 30 rolls along ramp 11 which comprises at the start, for example, linear part 70.

Now refer to FIGS. 6, 7 and 8 to follow the kinematics and the operation of the device of the invention.

FIG. 6 shows carriage roller 30 before it starts on concave curved part 44 of ramp 31. Axle 49 of connecting rod 20 and axle 50 of link 24 form angle alpha which is acute. Spring 53 has not yet been pulled.

FIG. 7 shows several positions of the roller, cooperating on the one hand with curved surface 44 of the ramp and on on the other hand with spring 53 whose movable leg 56 it pushes back between a position represented by dot-dash line 71, which is the initial position, and maximum push-back position 72. Thanks to the provisions of the invention, angle alpha between axis 49 and axis 50 remains substantially constant between the carriage position where the roller starts cooperating with the curved surface and the blocking position shown in FIG. 8, axis 50 being included in plane 45.

It is thus possible, on the one hand, to compensate for the operational play caused by the length of the cables, while maintaining a constant clamping force (since angle alpha directly proportional to this clamping force remains substantially constant over a non-negligible length of linear carriage travel) and, on the other hand, tolerating without inconvenience the unavoidable bruising that will occur on curved surface 44 and the surface of the roller during the "life" of the clamping head (for example, 1,600,000 blows). When the roller cooperates with the curved part, it also pulls the spring which is initially pushed back until the roller passes the highest point 58 of its convex part 57; then, once point 58 is passed, spring 53 exerts a thrust force on the clamping element, in addition to that of the link, to return to its initial position. This additional thrust force can be regulated by means 59, as explained above.

When the clamping has been completed, pneumatic means 8 pull cable 6. Carriage 28 and spring 53 are then pulled in the opposite direction with a growing reactive force against the movement of the carriage on the roller, until said roller has passed the hard point constituted by apex 58 of the convex part of the spring. Thus the spring, somewhat like a ratchet, ensures mechanical locking in addition to its thrust action during clamping.

The carriage then travels up to its release position 32 where the locking described above is effected automatically, end part 39 of cable 6 being pulled so that attachment axle 40 on carriage 28 slides in oblong hole 41 of the carriage and pushes the ball back into notch 38 by means of the rod springs.

It goes without saying and it results from the above that the invention is in no way limited to the particular embodiment considered here; on the contrary, it encompasses all its variations and, in particular, those where:

the means of linear travel of the carriage are not actuated pneumatically but hydraulically or electrically;

the spring is of a form other than the pin specifically described here;

the means for rotating the clamping element comprise two or more links, one of whose respective ends is attached around the axle integral with the clamping element, the other respective end being attached to the carriage pivotingly around the axle of two or more rollers arranged so as to cooperate with two or more guiding ramps of a certain form;

the carriage comprises several guide rollers;

the locking means in retracted position of the clamping element are of a different form than the particular one described above.

I claim:

1. A clamping device (1) for at least a set (2) of two plates (3, 4) or of two profiled elements placed one against the other, comprising at least a clamping head (5), said clamping head (5) comprising a body (11), a clamping element (12) suitable for pivoting round a fixed axle (22) integral with the body (11) and provided with a gripping end (13) intended for gripping or clamping said plates (3, 4) together against a buttressing part (14) and means (23) for rotating said clamping element (12) round the fixed axle (22), comprising at least a link (24) one of the ends of which (25) is attached pivotingly to said clamping element (12) round an axle (26) integral with the clamping element (12), parallel to the fixed axle (22), and the other end (27) is fixed pivotingly to a carriage (28) round the axle (29) of at least one roller (30) of said carriage, which is moveable substantially linearly along at least one guiding ramp (31) with a specified shape between a so-called retractable position (32) of the clamping element (12) and a so-called gripping position (33), said ramp (31) being attached to the body (11) of the clamping head (5) on one side of the fixed axle (22) opposite to the side which is occupied by the gripping end (13) when the carriage (23) is in said gripping position (33), and means for the linear travel (8) of the carriage (28) between these two positions (32, 33), characterized in that the guiding ramp (31) features a curved, concave surface (44) of contact with the roller (30) when the carriage comes into the gripping position (33) whose centers of curvature in each of the points of said surface (44) are located on the side of the fixed axle (22) with relation to the plane (45) defined by the central axis (26') of the axle (26) of the link (24), integral with the clamping element (12) and the central axis (29') of the roller (30) of the carriage (28) when the latter is in said gripping position (33), and the distance d between the central axis (26') of the axle (26) of the link (24), integral with the clamping element (12) and the central axis (29') of the roller (30) is greater than the distance d' between the central axis (22') of the fixed axle (22), and a plane (51), parallel to the fixed axle (22) passing through the central axis (29') of the roller (30) when the carriage (28) is in said gripping position (33).

2. A clamping device (1) according to claim 1, characterized in that the radii of curvature (46, 47, 48..) of the curved, concave surface (44), of contact with the roller (30) and distance d between the central axis (26') of the axle (26) of the link (24) integral with the clamping element (12) and the central axis (29') of the roller (30), are arranged in such a way to maintain, for a specified travel of the carriage up to its gripping position (33), an angle $\alpha$ which is substantially constant, between the plane (50) defined by the central axis (26') of the axle (26) of the link (24) integral with the clamping element (12) and the central axis (29') of the roller (30), and plane (49) defined by said axis (26') of the axle (26) of a link integral with the clamping element and the central axis (22') of the fixed axle (22).

3. A clamping device according to claim l, characterized in that the centers of curvature of the surface (44) are located substantially on a same straight line parallel to the fixed axle (22) and belonging to the plane (49) defined by the central axis (22') of the fixed axle and the central axle (26') of the axle (26) of the link (24) integral with the clamping element (12).

4. A clamping device according to claim 2, characterized in that the angle $\alpha$, which is substantially constant, is comprised within the range of 80° and 89° and advantageously between 85° and 88°.

5. A clamping device according to claim 1, characterized in that the relation between the distance d of a central axis (26') of the axle (26) of the link (24) integral with the clamping element (12) and the central axis (29') of the roller (30) of the carriage (28), and the distance d between the central axis (22') of the fixed axle (22) and the plane (51), parallel to the fixed axle (22), passing through the axis (29') of the rOller, when the carriage is in the gripping position (33), is comprised between 1.02 and 1.1.

6. A clamping device according to claim 1, characterized in that the guiding ramp (31) includes, in the area of the curved concave surface (44) of contact with the roller, a central recessed portion (52), provided with a spring (53) arranged in such a way to exert a determined force onto the link (24) via the roller (30) and crosswise to the direction of linear travel (55) of the carriage (28), when said carriage is in the gripping position.

7. A clamping device according to claim 6, characterized in that a spring (53) consists of a removable pin, featuring a flexible leg (56) provided with a portion (57) of convex surface suitable for coming into contact with the roller (30), said flexible leg (56) being compressed by said roller (30), and the apex (58) of said convex surface (57) being arranged in such a way not to protrude beyond said roller (30) when the carriage (28) is in the gripping position (33), so that a locking of the roller by the pin (53) is performed in said gripping position (33).

8. A clamping device according to claim 6, characterized in that the guiding ramp (31) further includes means (59) intended for adjusting said determined force exerted by the spring (53) onto the crankpin (28) via the roller (30).

9. A clamping device according to claim 1, characterized in that it includes means (34) for locking the carriage (28) in the retractable position (32) of the clamping element comprising two rod springs (35, 36), substantially parallel, located on either side of said carriage (28), attached to the body (11) and suitable for compressing a ball (37) integral with said carriage (28), into a notch of an extreme part (39) of the means of linear travel (8) of said carriage, said extreme part (39) being fixed onto said carriage (28) with an operational clearance allowing a linear travel in the same direction as the travel of said carriage, and being arranged in such a way that said notch (38) faces the ball (37) in the locking position when the linear travel means (8) of the carriage are actuated in a direction, and in such a way to spread said notch by driving back the ball in order to unlock the carriage when the means of linear travel are actuated in the reverse direction.

10. A clamping device according to claim 1, characterized in that the means of linear travel (8) of the carriage (28) comprise a cable (6), fixed onto said carriage (28) and arranged in such a way to transmit to said carriage both the traction forces and the thrust forces, and means (60) of pneumatic actuation of said cable (6) suitable for allowing the travel of said carriage between the retractable position (32) of the clamping element and the gripping position (33).

11. A clamping device according to claim 10, comprising at least two clampting heads, characterized in that the means (60) of pneumatic actuation comprise a pneumatic sequencer provided with two drawers (61*a*, 61*b*) supplied with compressed air and suitable for simultaneously pulling the cable (6) of one of said two clamping heads and pushing the cable (6*a*) of the other of said two clamping heads.

* * * * *